United States Patent [19]

Tamminen

[11] 4,268,589
[45] May 19, 1981

[54] CELL HAVING IMPROVED RECHARGEABILITY

[75] Inventor: Pentti J. Tamminen, Espoo, Finland

[73] Assignee: Imatra Paristo Oy, Finland

[21] Appl. No.: 966,608

[22] Filed: Dec. 5, 1978

[30] Foreign Application Priority Data

Dec. 8, 1977 [FI] Finland .................................. 773706
Apr. 3, 1978 [GB] United Kingdom ............... 12861/78

[51] Int. Cl.³ ............................................. H01M 6/04
[52] U.S. Cl. .................................... 429/207; 429/224
[58] Field of Search ............... 429/206, 224, 207, 229, 429/220, 225, 222

[56] References Cited

U.S. PATENT DOCUMENTS

| | | | |
|---|---|---|---|
| 1,303,844 | 5/1919 | Antonoff | 429/224 X |
| 2,513,292 | 7/1950 | Denison et al. | 429/207 |
| 2,941,909 | 6/1960 | Johnson et al. | 429/207 |
| 3,281,278 | 10/1966 | Schaefer | 429/207 X |
| 3,418,166 | 12/1968 | Carter | 429/207 |
| 3,466,195 | 9/1969 | Spellman | 429/207 |
| 3,530,496 | 9/1970 | Amano et al. | 429/224 X |
| 3,905,833 | 9/1975 | Louzos | 429/207 |
| 4,060,670 | 11/1977 | Tamminen | 429/154 |
| 4,076,909 | 2/1978 | Lindstrom | 429/207 |

*Primary Examiner*—Charles F. LeFevour
*Attorney, Agent, or Firm*—Mason, Kolehmainen, Rathburn & Wyss

[57] ABSTRACT

An alkaline/manganese dioxide cell which is repeatedly rechargeable from a deeply discharged state is produced chemically contacting the manganese dioxide with free negative ions of at least one weak acid that does not, in the conditions prevailing in the cell, form salts with manganese the crystals of which contain water of crystallization. Suitable weak acids are silicic, carbonic, boric, cyanic and acetic acids and hydrogen sulphide.

13 Claims, 6 Drawing Figures

CELL HAVING IMPROVED RECHARGEABILITY

DESCRIPTION

This invention relates to cells of the type employing an alkaline electrolyte, a positive electrode mass containing a depolarizing agent comprising finely divided manganese dioxide and containing a conductive inert material, and a metallic negative electrode mass.

A conventional alkaline manganese dioxide/zinc cell can be recharged if about 25 percent at most of the primary capacity has been used. In this case, about 50 discharge-charge cycles may be obtained. In specially built cells where the active layers are very thin, about 150 discharge-charge cycles have been obtained with this discharge depth.

Recently, it has been discovered that by means of adding nickel oxide to the positive electrode mass the recharging capacity of a cell of the above-mentioned type can be increased and also the rechargeability itself can be improved. This is, however, not yet sufficient to make a practical secondary battery.

It is an object of this invention to provided a cell of the above-mentioned type whose recharging characteristics have been improved to the extent that a battery formed of such cells may be considered to be a practical secondary battery.

According to one aspect of the present invention there is provided a cell of the type employing an alkaline electrolyte, a positive electrode mass containing a depolarizing agent comprising finely divided manganese dioxide and containing a conductive inert material, and a metallic negative electrode mass, characterised in that it contains at least one compound capable of permitting oxidation of lower manganese oxides during passage of charging current through the cell, whereby the recharging capability of the cell from a substantially completely discharged state is improved. The cell of this invention is provided with this improved capability by providing that the manganese dioxide of the positive electrode mass is in chemical contact with negative ions of at least one weak acid that does not in the conditions prevailing in the cell form salts with manganese, the crystals of which contain water of crystallization. Very preferably said at least one weak acid does not form salts with the metal(s) of the negative electrode mass, the crystals of which contain water of crystallization. Preferably the ions are selected such that migration of metallic ions from the negative electrode towards the positive electrode is minimized.

The invention also embraces a battery comprising two or more such cells.

The negative ions may be inorganic in nature such as, for example, borate, carbonate, cyanide, sulphide or silicate, or may be organic in nature, such as for example acetate. Preferred ions are borate and carbonate. The acids per se may be employed, where they exist, or salts of the acids, such as with alkali or alkaline earth metals, may be employed.

It should be said that it is known to add boric acid to alkaline/silver/zinc cells to reduced the pH of the electrolyte thus to prevent or reduce zinc corrosion (cf eg.Vinal: Primary Batteries, 1951, p.265). In this case the boric acid was added in an amount of 1.87 g/25 ml of 40% sodium hydroxide solution. It has previously been thought that the addition of small quantities of borate to an electrolyte would cause passivation of the zinc. The effect of boric acid addition on the rechargeability of an alkaline cell employing manganese dioxide has, as far as is known, never been discovered.

According to a further aspect of the present invention there is provided a method of improving the rechargeability from a substantially completely discharged state of a cell of the type employing an alkaline electrolyte, a positive electrode mass containing a depolarizing agent comprising finely divided manganese dioxide and containing a conductive inert material and a metallic negative electrode mass, characterized in that it contains at least one compound capable of permitting oxidation of lower manganese oxides during passage of recharging current through the cell. This is achieved by providing that the manganese dioxide is chemically contacted with negative ions of at least one weak acid that does not in the conditions prevailing in the cell form salts with manganese, the crystals of which contain water of crystallization. Very preferably, said at least one weak acid does not form salts with the metal(s) of the negative electrode, the crystals of which contain water of crystallization.

Without wishing to be limited in any way by the explanation it is thought at the present time that the additives of this invention work by providing an acidic environment for the manganese dioxide in which the solubility of the lower manganese oxides (e.g. $Mn_3O_4$) is increased, whereby oxidation of these oxides can occur during passage of recharging current through the cell.

The week acid or salt thereof employed in the present invention may be used either in solid or liquid form depending upon the nature of the acid and its solubility in the electrolyte. The liquid may be the natural state of the weak acid employed or may be a solution thereof or a solution of a salt thereof.

If the weak acid or the salt thereof which is to be employed is used as a solid, then the solid is intimately incorporated into the positive electrode mass and this may be done by mixing the solid with manganese dioxide mand conductive inert material and thereafter moistening the mixture with alkaline electrolyte (eg.-sodium hydroxide or potassium solution). Alternatively but not exclusively the solid may be first mixed with the alkaline electrolyte and then rapidly mixed with manganese dioxide and conductive inert material.

An example of a weak acid, including salts thereof, which is preferably incorporated as a solid is boric acid and its salts, although its salts may be incorporated as solutions if their solubility in the electrolyte is sufficient.

If the weak acid or salt thereof which is to be employed is used as a liquid then the liquid, which should generally be miscible with the alkaline electrolyte, may be simply mixed with the alkaline electrolyte in the desired proportions. An example of such a liquid is potassium carbonate solution.

In the case of silicic acid the weak acid may be incorporated as a solid and will subsequently dissolve in the electrolyte. Conversely it may be possible, by making use of temperature-dependent solubility changes, to precipitate out of the electrolyte the weak acid or salt thereof to ensure intimate incorporation of the weak acid or its salt in the positive electrode mass.

The weak acid or salt thereof is generally employed in the cell in a relatively large quantity. For instance in the case of boric acid this amount may be for example from 5 to 25 grams per 100 grams of manganese dioxide. In the case potassium carbonate solution used with an alkali hydroxide-containing electrolyte the weight ratio of carbonate:hydroxide may be, for example, from 2:1 to 3:1.

Sufficient alkaline electrolyte should generally be present to overcome the neutralizing effects of the weak acid or its salt.

It should be emphasized however, that for particular purposes the ranges referred to above may be extended. For example if potassium carbonate is used as the salt of the weak acid, its solution may be used alone to provide both the negative ions and the alkaline electrolyte, if a cell be required for small drain applications, such as for use in an electric watch. Conversely for short time high drain applications, such as for a car battery, it may be desirabled to use considerably less carbonate than previously specified, for example, from 35 to 50% by weight of the total solids in the electrolyte.

Two or more of the weak acids or salts thereof defined for use in the present invention may be employed together.

Examples of cells according to this invention will now be described, by way of example only, with reference to the accompanying drawings, in which.

Figure 5:
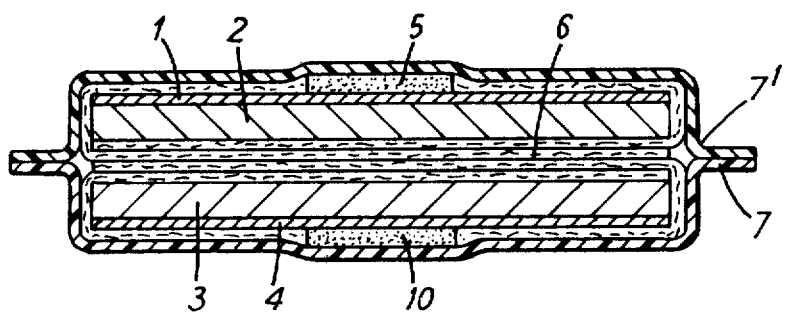

FIG. 5 shows a cell of the type described and claimed in my U.S. Pat. No. 4060670; and FIG. 6 shows a battery formed from a cell of FIG. 5.

Referring firstly to FIG. 5, a steel sheet 1 is a positive current collector. Its under-surface is covered with a paint made conductive by means of graphite and carbon black and having a binding material resistant to the electrolyte used, in the present case KOH-solution.

The positive electrode is a mix cake 2 compressed from carbon and manganese dioxide powder and moistened with electrolyte. The negative electrode 3 contains amalgamated zinc powder and an electrolyte gel containing carboxymethylcellulose. The negative current collector 4 is a steel sheet which has been treated in a KOH-solution together with excessively amalgamated zinc powder so that no hydrogen evolution takes place on its surface in the circumstances prevailing within the cell unit. In the middle of the outer surface of each current collector sheet 1 and 4 there is a sticky insulating layer 5 and 10 of bitumen, softened with oil. Each electrode with its current collector is separately packed in a separator paper 6 in which there is, at the place of the insulating layer (5,10) a hole of about the same size as said layer. The electrode elements, disposed against each other, are packed in a plastic envelope 7,7' by heat sealing preferably in vacuum whereby the plastics envelope is tightly compressed around the galvanic cell formed and against the insulating layers 5 an 10.

Figure 6:
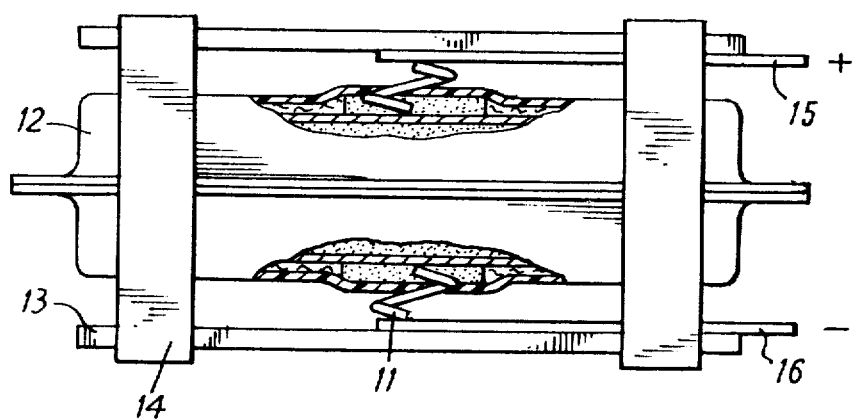

FIG. 6 schematically illustrates a battery comprising a cell 12, contact elements 11, end plates 13 which may be E.G. of stiff plastics or cardboards, bonds 14 which may be E.G. rubber rings, and metallic contact strips 15 and 16 which form the positive and negative poles of the battery.

Figure 1:
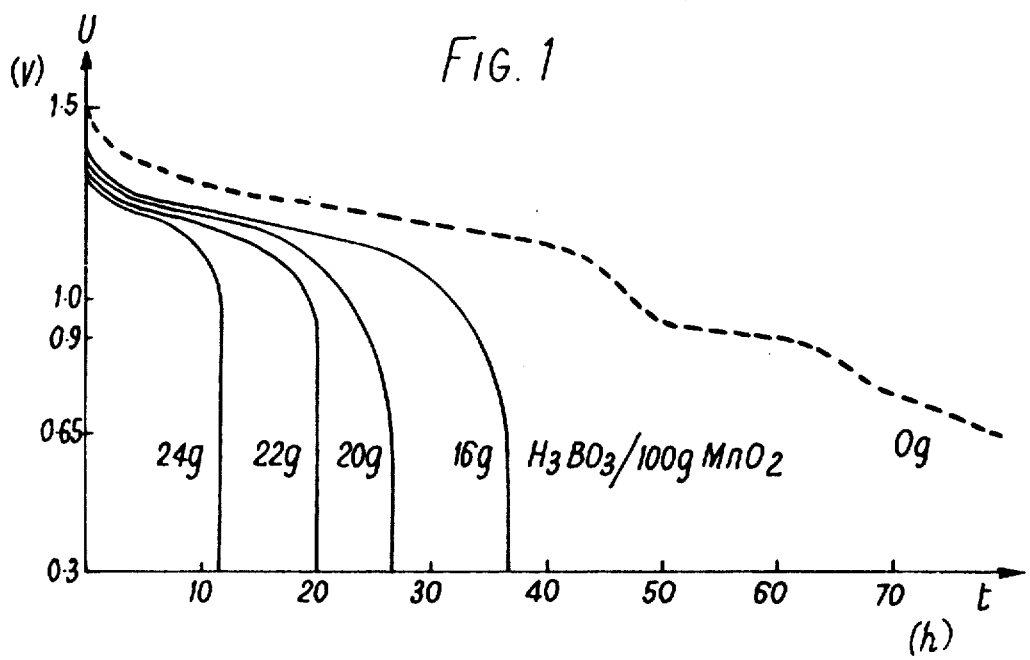
FIG. 1 is a graph illustrating the effect of a boric acid addition on the first discharge of a battery cell after 18 months' storage time.
Figure 2:
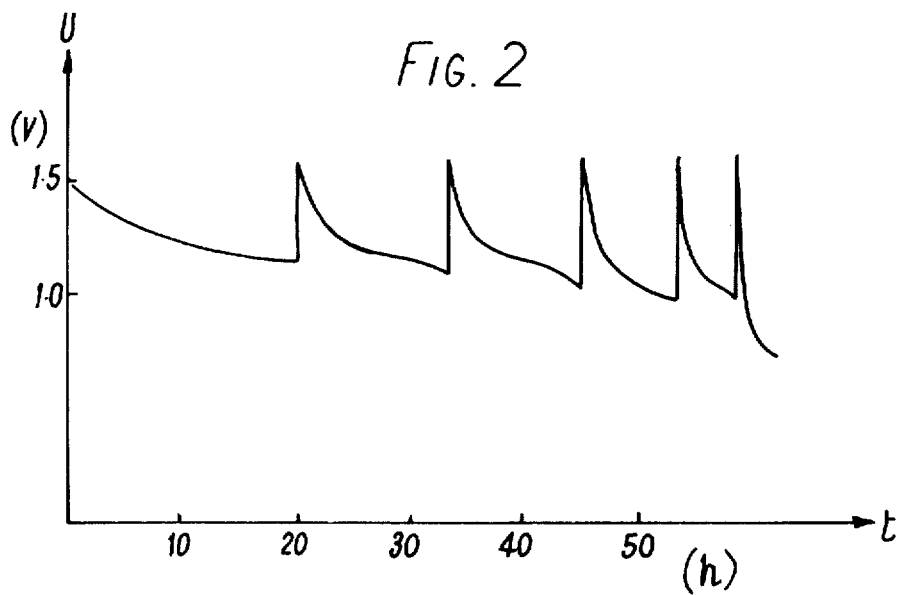
FIG. 2 is a comparative and illustrates the rechargeability of a conventional alkaline/manganese dioxide/zinc battery cell when discharged to a depth of about 50 percent of its effective Amp/hours (Ah) capacity.
Figure 3:
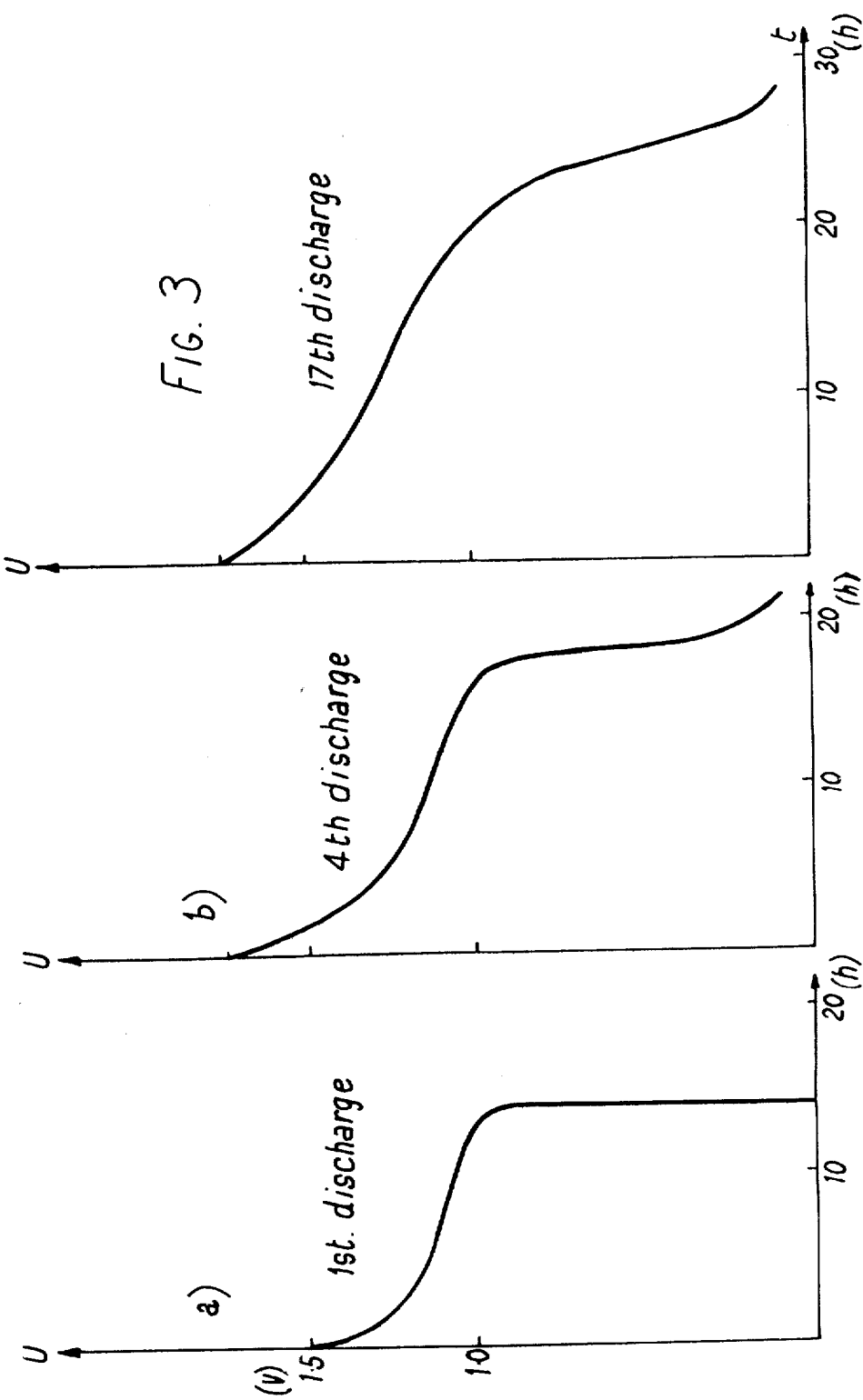
FIG. 3 illustrates the rechargeability of a battery cell with a boric acid addition when completely discharged after 24 months' storage time.

Referring now to FIGS. 1 to 3, the tests were carried out with a flat cell structure according to U.S. Pat. No. 4,060,670 and as shown in FIG. 5. In FIG. 1, broken lines represent the discharge curve of a conventional fresh alkaline/manganese dioxide/zinc battery cell without any additive. In FIG. 1, a distinct decline will be noted at the state (after about 45 hours) where the positive electrode begins to undergo an irreversible reaction. For example, hausmannite ($Mn_3O_4$) does not revert to manganese dioxide ($MnO_2$) when charged.

The next decline (after about 65 hours) is due to the formation of oxides which are still lower in oxygen content.

The four other curves show how boric acid added to the positive mass of a battery cell which is similar in other respects affects the shape of the discharge curve and at the same time also the primary capacity of the cell, while reducing it in relation to the quantity of boric acid. It should be noted that there is no stepped shape similar to the previous curve to be seen.

When the conventional cell having no boric acid, whose performance inter alia is shown in FIG. 1, was completely discharged it was not rechargeable.

When the conventional cell was discharged for only about 20 hours (or to a depth of about 50 percent of its effective primary capacity) and thereafter charged to a constant voltage of about 1.6 volts, charge-discharge curves according to FIG. 2 were obtained. As can be seen, the rechargeability of the cell was quickly reduced along with the charging times and after the 5th charging time the effective capacity of the battery was negligible (maybe 1 Ah).

An alkaline/manganese dioxide battery cell was then prepared using mixture ratios as follows: 100 parts by weight of manganese dioxide ($MnO_2$) powder, 45 parts by weight of graphite (C), 77 parts by weight of a 40 percent potassium hydroxide solution and 16 parts by weight of finely divided boric acid ($H_3BO_3$).

The mixing was carried out so that the manganese dioxide and graphite as well as the boric acid were firstly mixed together whereafter water and, after a further mixing period, potassium hydroxide flakes were added to the mixture. It has been found that from 5 to 25 grams of boric acid per 100 grams of manganese dioxide is most suitable for medium current density applications.

When a test corresponding to the above was made with a cell provided with such a boric acid addition of 16 g/100 g manganese dioxide, where the boric acid has been added in the dry state, the effective capacity of the first discharging time was relatively small (FIG. 3a). When the cell, however, was recharged, the discharge curve improved whereby, for example, the energy content of the fourth discharge corresponds to that of the first discharge according to FIG. 2. In the seventeenth discharge of the cell, the discharge curve whereof was repeated as the test continued, the capacity obtained from the cell noticeably exceeded that of the first discharge of the above mentioned primary cell. It can thus be said that the shape of the discharge curve markedly improves to a certain limit, although the first discharge as such does not indicate any advantageous situation. What is especially surprising is the complete rechargeability of a cell with a boric acid addition despite the fact that it has been repeatedly substantially fully discharged.

It should be emphasized again that boric acid can be added either in powder form to a dry positive mass or as a suspension to the electrolyte.

It is also noted that the negative electrode of the cells in the foregoing tests consisted of a conventional amalgamated zinc paste containing alkaline electrolyte and gelling agents. In an assembled cell, the borate ions are, of course, diffused also into the separator and the negative electrode mass. The rechargeability of a zinc electrode in alkaline battery cells is a well-known difficult problem because zinc dendrites produced during charging tend to grow through the separator, thereby producing an internal short circuit. Surprisingly it has been discovered that when the above mentioned cells with a boric acid addition are opened after several tens of discharge/charge cycles, no growth of zinc dendrites through the separator is noted. A suitable addition of boric acid obviously improves the rechargeability of both electrode masses. When the cell, whose performance is shown in FIG. 2 was opened, the zinc dendrites had thoroughly grown into the separator as a gray layer.

Figure 4:
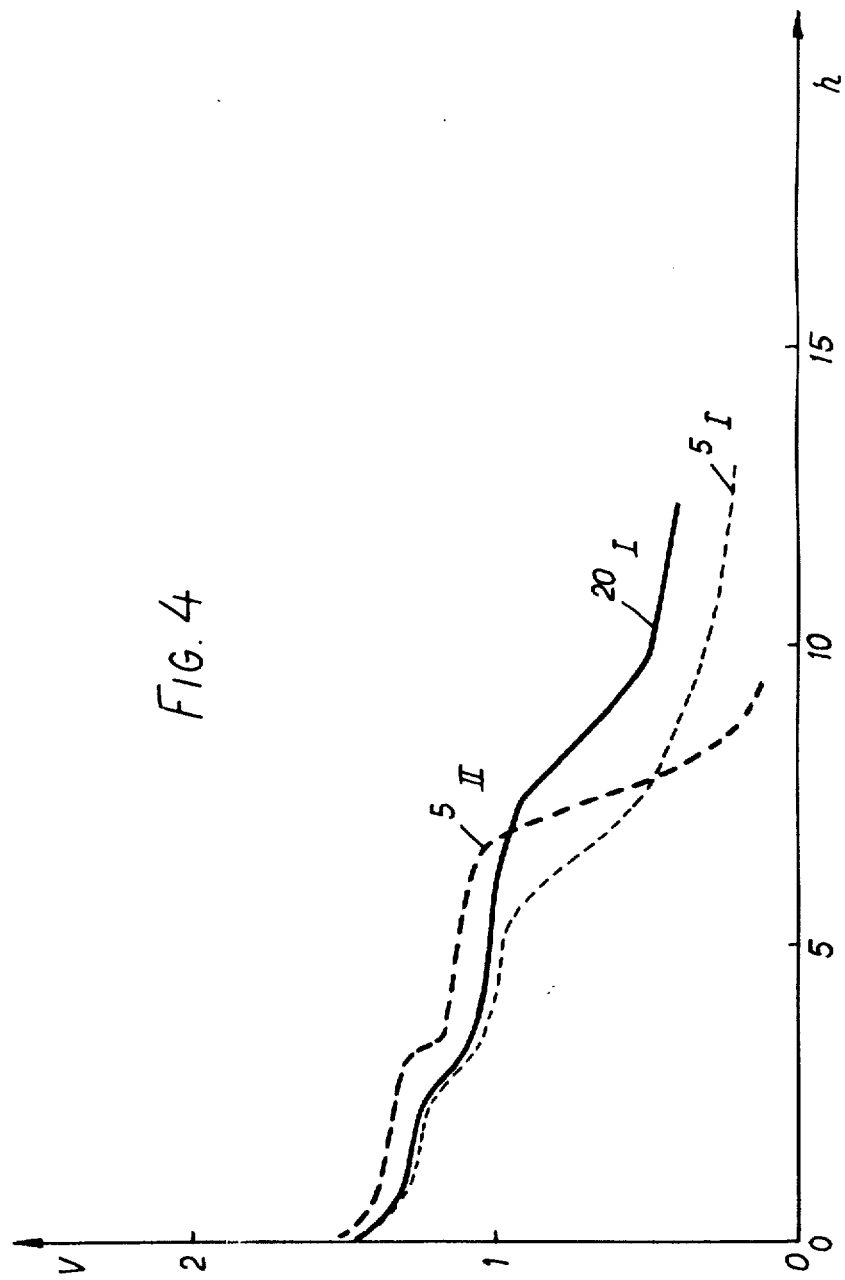
FIG. 4 illustrates the effect of potassium carbonate additions to battery cells on fifth and twentieth discharges and on a fifth discharge, respectively.

Referring now to FIG. 4 of the drawings, two batteries were employed having a construction as described above with reference to U.S. Pat. No. 4,060,670 and which will be referred to respectively as cell 1 and cell 2.

In cell 1 the relation between potassium carbonate and potassium hydroxide in the electrolyte was 2.4:1, and the amount of solid matter in the aqueous solution was about 32%. The anode was mercury-amalgamated zinc powder containing 4% of carboxymethylcellulose as gelling agent. The cathode mix comprised electrolytic manganese oxide and graphite in a weight ratio of 100:45. All discharges were complete, as seen in the plot. It is surprising to note that discharge No. 20 was better than discharge No. 5.

Cell 2 was in other respects similar to cell 1, but the weight ratio of potassium carbonate to that of potassium hydroxide was 2.6:1 in the electrolyte. Other experiments have shown that the optimumum ratio for potassium carbonate in medium current density applications (e.g. 5 m A/cm$^2$) is between 2 and 3:1.

The cells 1 and 2 were charged at constant voltage 1.65 V; no gassing was observed.

Although the foregoing tests have been described in conjunction with cells using zinc in the negative electrode mass, the invention is also applicable to cells containing other negative electrode materials such as, for example, copper, lead, cadmium, and mixtures and alloys of two or more of these metals with each other or with zinc. In accordance with procedures known in the art, small quantities of mercury may also be present to prevent hydrogen evolution at the negative electrode.

Additionally, although the above tests have been described in conjunction with flat cells and indeed although such a structure is very suitable for the cells of this invention, the invention is not limited to such cells. It is envisaged that cells according to the present invention can be made in any appropriate shape or size and that the characteristics of the cells may be tailored to meet particular requirements. The cells of the present invention are particularly suitable for use in hermetically sealed units since the problems of gassing and of swelling are substantially completely elminated thereby, but it is envisaged that the cells of this invention could employ a venting system. A plurality of the cells of this invention can be made up into a battery having a particular shape, structure or properties as required.

Moreover, although the above tests have been described in conjunction with potassium hydroxide solution as the alkaline electrolyte other alkalis or mixtures thereof may be employed. Thus, for example a solution containing equal quantities of potassium hydroxide and sodium hydroxide has been found to be effective. Moreover in certain systems it may not be necessary to use an alkali hydroxide and there may be employed another alkalinity-inducing agent.

Finally in each of the tests described above the conductive inert material employed was graphite. However any other suitable conductive material may be substituted, in whole or in part, for the graphite.

It goes without saying that other additives and procedures which are adopted or employed in the art may be freely employed in the present invention where suitable. An example of one commonly employed additive is nickel oxide which is often added to the positive electrode mass to improve its characteristics.

This invention has made it possible to recharge a cell after a complete discharge substantially without reducing the capacity of the cell. One result of this is a deep-dischargeable alkaline/manganese dioxide accumulator. In the above embodiments the watt hours (Wh) capacity of the accumulator per each unit of weight is approximately as large as the capacity of a lead acid accumulator of the same weight (about 35 Wh/kg). An additional advantage accrues if the accumulator is hermetically sealed, by which means its charge may be retained for years without any significant self-discharge. An accumulator of this kind can be mounted in any position because of the electrolyte is absorbed in the separators and active masses. The accumulator functions the better the thinner its active layers are. Under these circumstances, also a more advantageous capacity per weight ratio is obtained.

I claim:

1. A deep-dischargeable secondary cell comprising an aqueous alkaline electrolyte, a positive electrode mass comprising finely divided manganese dioxide and a conductive inert material, a negative electrode mass composed of a material selected from the group consisting of zinc, copper, lead, cadmium, and mixtures and alloys of at least two of these metals, the manganese dioxide of the positive electrode mass being in chemical contact with free negative ions derived from boric acid which is present in the positive electrode mass as finely divided particles.

2. A cell according to claim 1 wherein the boric acid is present in an amount of from 5 to 25 grams per 100 grams of manganese dioxide.

3. A deep-dischargeable secondary cell comprising an aqueous alkaline electrolyte, a positive electrode mass comprising finely divided manganese dioxide and a conductive inert material, a negative electrode mass composed of a material selected from the group consisting of zinc, copper, lead cadmium, and mixtures and alloys of at least two of these metals, the manganese dioxide of the positive electrode mass being in chemical contact with free negative carbonate ions derived from a carbonate dissolved in the alkaline electrolyte.

4. A cell according to claim 3, wherein the carbonate is present in an amount of from 200 to 300 percent by weight of the weight of alkali in the alkaline electrolyte.

5. A cell according to claim 3, wherein the carbonate provides both the weak acid and the alkaline electrolyte.

6. A cell according to claim 3, wherein the carbonate is that of an alkali metal.

7. A deep-dischargeable secondary cell comprising an aqueous alkaline electrolyte, a positive electrode mass comprising finely divided manganese dioxide and a conductive inert material, a negative electrode mass composed of a material selected from the group consisting of zinc, copper, lead, cadmium, and mixtures and alloys of at least two of these metals, the manganese dioxide of the positive electrode mass being in chemical contact with free negative ions derived from acetic acid.

8. A method of rendering rechargeable from a substantially completely discharged state a cell comprising an aqueous alkaline electrolyte, a positive electrode mass comprising finely divided manganese dioxide and a conductive inert material and a zinc negative electrode mass which comprises chemically contacting the manganese dioxide of the positive electrode mass with negative ions derived from boric acid.

9. A method according to claim 8, wherein the boric acid incorporated in or mixed with the manganese dioxide in an amount of from 5 to 25 grams per 100 grams of manganese dioxide.

10. A method of rendering rechargeable from substantially completely discharged state a cell comprising an aqueous alkaline electrolyte, a positive electrode mass comprising finely divided manganese dioxide and a conductive inert material and a zinc negative electrode mass which comprises chemically contacting the manganese dioxide of the positive electrode mass with negative ions comprising carbonate dissolved in the electrolyte.

11. A method according to claim 10, wherein the electrolyte also comprises an alkali hydroxide and the weight ratio of the carbonate to the hydroxide is from 2 to 3:1.

12. A method of rendering rechargeable from a substantially completely discharged state a cell comprising an aqueous alkaline electrolyte, a positive electrode mass comprising finely divided manganese dioxide and a conductive inert material and a zinc negative electrode mass which comprises chemically contacting the manganese dioxide of the positive electrode mass with negative ions comprising potassium carbonate which is employed as a solution to provide both the weak acid and the alkaline electrolyte.

13. A method of increasing the discharge capacity of a cell comprising:

discharging a portion of the initial cell power capacity wherein said cell comprises an aqueous alkaline electrolyte, a positive electrode mass comprising finely divided manganese dioxide and a conductive inert material, a negative electrode mass composed of a material selected from the group consisting of zinc, copper, lead, cadmium, and mixtures and alloys of at least two of these metals, the manganese dioxide of the positive electrode mass being in chemical contact with free negative ions of boric acid and passing recharging current through said cell to recharge said cell whereby the discharge capacity of said cell after recharging is greater than the discharge capacity before said discharging.

* * * * *